United States Patent [19]

Büch et al.

[11] Patent Number: 5,166,338
[45] Date of Patent: Nov. 24, 1992

[54] WATER-SOLUBLE FIBER-REACTIVE DYES AND PREPARATION AND USE THEREOF

[75] Inventors: Holger M. Büch, Hofheim am Taunus; Josef Geisenberger, Sulzbach; Hartmut Springer, Königstein, all of Fed. Rep. of Germany

[73] Assignee: Hoechst Aktiengesellschaft, Frankfurt, Fed. Rep. of Germany

[21] Appl. No.: 654,873

[22] Filed: Feb. 13, 1991

Related U.S. Application Data

[63] Continuation of Ser. No. 486,503, Feb. 28, 1990, abandoned.

[30] Foreign Application Priority Data

Mar. 1, 1989 [DE] Fed. Rep. of Germany ....... 3906353

[51] Int. Cl.$^5$ ............................................. C09B 47/28
[52] U.S. Cl. ................................... 540/130; 540/133; 540/140; 544/74; 544/75; 544/76
[58] Field of Search .............. 540/122, 130, 133, 140; 534/617, 618; 544/74, 75, 76

[56] References Cited

U.S. PATENT DOCUMENTS

| | | | |
|---|---|---|---|
| 3,118,943 | 1/1964 | Buc et al. | 534/641 |
| 3,277,075 | 10/1966 | Mayhew et al. | 534/631 |
| 3,772,335 | 11/1973 | Meininger et al. | 260/336 |
| 4,473,498 | 9/1984 | Schlafer et al. | 534/641 |

FOREIGN PATENT DOCUMENTS

| | | | |
|---|---|---|---|
| 1955849 | 5/1971 | Fed. Rep. of Germany . | |
| 1441328 | 4/1966 | France | 534/641 |
| 46-41432 | 12/1971 | Japan | 534/641 |
| 931596 | 12/1960 | United Kingdom . | |

Primary Examiner—Richard L. Raymond
Assistant Examiner—Brian M. Burn
Attorney, Agent, or Firm—Connolly and Hutz

[57] ABSTRACT

Anthraquinone, phthalocyanine, formazan, azomethine, dioxazine, phenazine, triphenylmethane, xanthene, thioxanthone, nitroaryl, naphthoquinone, pyrenequinone and perylenetetracarbimide dyes which contain one or two groups of the general formula

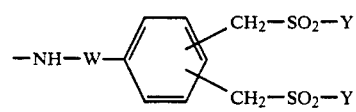

where Y is vinyl or an ethyl group which contains in a β-position a substituent which is eliminable by means of alkali to form a vinyl group, and W is a direct bond or a group of the general formula

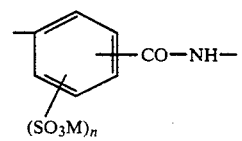

where M is a hydrogen atom or an alkali metal and n is zero, 1 or 2. The dyes have very good fiber-reactive properties and are advantageously suitable for dyeing carboxamino- and/or hydroxy-containing material, for example wool, in particular cellulose fiber materials; on these materials they produce strong fast shades in a high degree of fixation.

7 Claims, No Drawings

WATER-SOLUBLE FIBER-REACTIVE DYES AND PREPARATION AND USE THEREOF

This application is a continuation of copending application Ser. No. 07/486,503, filed on Feb. 28, 1990, now abandoned.

DESCRIPTION

The present invention relates to fiber-reactive dyes.

The practice of dyeing with reactive dyes has in recent years led to increased demands on the quality of the dyeings and the economics of the dyeing process. There consequently continues to be a demand for new reactive dyes which have improved properties and not only produce dyeings and prints having good wet and light fastness properties but also are particularly suitable for dyeing cellulose-containing fiber materials by exhaust and padding methods.

The present invention now provides such dyes having the abovementioned good properties; the dyes according to the present invention conform to the general formula (1)

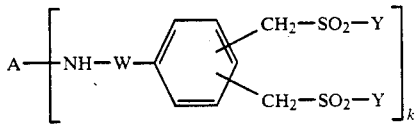

where:

A is the radical of an anthraquinone, phthalocyanine, formazan, azomethine, dioxazine, phenazine, triphenylmethane, xanthene, thioxanthone, nitroaryl, naphthoquinone, pyrenequinone or perylenetetracarbimide dye, W is a direct bond or a group of the general formula (2)

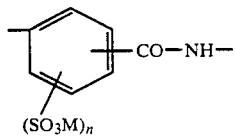

where

M is a hydrogen atom or an alkali metal such as sodium, potassium or lithium, and n is zero (in which case this group is hydrogen), 1 or 2 and the carbonylamino group is preferably attached to the benzene nucleus in the meta- or para-position relative to the free bond which connects to the amino group —NH—, Y is vinyl or an ethyl group which is substituted in the β-position by a substituent which is eliminable by means of alkali to form a vinyl group, for example β-sulfatoethyl, β-thiosulfatoethyl, β-phosphatoethyl or β-haloethyl, such as β-bromoethyl or β-chloroethyl, or a β-acyloxyethyl group where the acyl moiety comes from an aliphatic or aromatic carboxylic or sulfonic acid, for example a β-alkanoyloxyethyl radical, especially β-acetyloxyethyl, or β-benzoyloxyethyl, β-sulfobenzoyloxyethyl or β-(p-toluenesulfonyloxy)ethyl, and k is 1 or 2 (if k is 2, the two groups can be different from each other but are preferably identical to each other).

Preferably, A is the radical of an anthraquinone, phthalocyanine, triphendioxazine or formazan dye, and preferably Y is vinyl, β-chloroethyl or particularly preferably β-sulfatoethyl.

The radical A may contain bonded to its basic structure the substituents customary for organic dyes, for example: alkyl of 1 to 4 carbon atoms such as methyl, ethyl, propyl, isopropyl or butyl, preferably ethyl or in particular methyl; alkoxy of 1 to 4 carbon atoms, such as methoxy, ethoxy, propoxy, isopropoxy or butoxy, preferably ethoxy or in particular methoxy; acylamino of 2 to 8 carbon atoms, such as acetylamino, propionylamino or benzoylamino; primary and mono- or disubstituted amino, such as alkylamino and dialkylamino having 1 to 4 carbon atoms in the alkyl moiety, which alkyl moieties may be further substituted, for example by phenyl, sulfophenyl, hydroxy, sulfato, sulfo or carboxy, e.g. methylamino, ethylamino, propylamino, isopropylamino, butylamino, N,N-di(β-hydroxyethyl)amino, N,N-di(β-sulfatoethyl)amino, sulfobenzylamino, N,N-di(sulfobenzyl)amino or diethylamino; alkoxycarbonyl with an alkyl moiety of 1 to 4 carbon atoms, such as methoxycarbonyl or ethoxycarbonyl; alkylsulfonyl of 1 to 4 carbon atoms, such as methylsulfonyl or ethylsulfonyl; trifluoromethyl; nitro; cyano; halogen, such as fluorine, chlorine, bromine; carbamoyl groups which may be monosubstituted or disubstituted by alkyl of 1 to 4 carbon atoms which in turn may be substituted for example by hydroxy, sulfato, sulfo, carboxy, phenyl or sulfophenyl, e.g. N-methylcarbamoyl or N-ethylcarbamoyl; sulfamoyl groups which may be monosubstituted or disubstituted by alkyl of 1 to 4 carbon atoms, and N-phenyl-N-alkylsulfamoyl groups with an alkyl group of 1 to 4 carbon atoms, which alkyl groups may in turn be substituted by hydroxy, sulfato, sulfo, carboxy, phenyl or sulfophenyl, e.g. N-methylsulfamoyl, N-ethylsulfamoyl, N-propylsulfamoyl, N-isopropylsulfamoyl, N-butylsulfamoyl, N-(β-hydroxyethyl)sulfamoyl or N,N-di(β-hydroxyethyl)sulfamoyl; N-phenylsulfamoyl; ureido; hydroxy; carboxy; sulfomethyl and sulfo.

Preferably, the dye residue A is substituted by one or more, such as 2 to 4, sulfo groups and also preferably by substituents selected from the group consisting of methyl, ethyl, methoxy, ethoxy, acetylamino, benzoylamino, amino, chlorine, bromine, ureido, hydroxy, carboxy and sulfomethyl.

The dye residue A may also possess other fiber-reactive groups known from the literature which do not conform to the structure of the general formula (3)

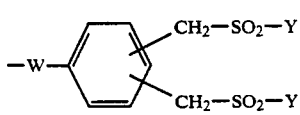

where W and Y are each as defined above. Such known fiber-reactive groups are for example a group of the vinyl sulfone series, such as a group of the formula —SO₂—Y with Y of the above meaning, which may be bonded to A via an alkylene radical, such as a methylene group, or via a methylamino or ethylamino group; a low molecular weight alkanoylamino radical which is substituted by a detachable atom or group; a low molecular weight alkenoylamino or alkenesulfonylamino radical which may be substituted by a detachable atom or group; a carbocyclic, carbocyclic-heterocyclic or heterocyclic radical, the heterocyclic moieties of which being four-, five- or six-membered, which are substituted by a detachable atom or group and which are bonded to A via a carbonylamino or sulfonylamino group; a triazinyl or pyrimidinyl radical substituted by a detachable atom or group and bonded to A via an amino, methylamino or ethylamino group. Such radicals are, for example, a halogeno-substituted six-membered heterocyclic radical, such as a halotriazinyl or halopyrimidinyl radical, attached to A via an amino, methylamino or ethylamino group, or an aliphatic acylamino radical, such as a haloacetylamino or halopropionylamino group.

Of the dyes of the general formula (1) according to the present invention, preference is given in particular to anthraquinone dyes conforming to the following general formula (4), phthalocyanine dyes conforming to the following general formula (5), triphendioxazine dyes conforming to the following general formula (6) and copper complex formazan dyes conforming to the following general formula (7):

$R^s$ is a hydrogen atom or an alkyl group of 1 to 4 carbon atoms, such as methyl or n-propyl or preferably ethyl, which may be substituted by sulfo, carboxy, phosphato, hydroxy, sulfato, phenyl, sulfophenyl, β-sulfatoethylsulfonyl or 3- or 4-(β-sulfatoethylsulfonyl)phenyl, preferably hydrogen, $R^t$ is a hydrogen atom or alkyl group of 1 to 4 carbon atoms, such as methyl or n-propyl or preferably ethyl, which may be substituted by sulfo, carboxy, phosphato, hydroxy, sulfato, phenyl, sulfophenyl, β-sulfatoethylsulfonyl or 3- or 4-(β-sulfatoethylsulfonyl)phenyl, or is a phenyl radical which may be substituted by 1 or 2 substituents selected from the group consisting of methyl, ethyl, methoxy, ethoxy, chlorine, sulfo, carboxyl and β-sulfatoethylsulfonyl, but preferably is hydrogen, b is an integer or non-integer from 1 to 2, c is an integer or non-integer from zero to 2, preferably zero, d is an integer or non-integer from zero to 3, preferably

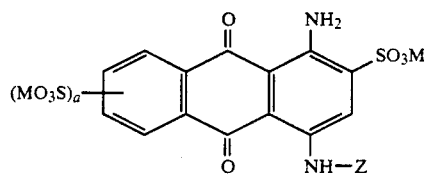

(4)

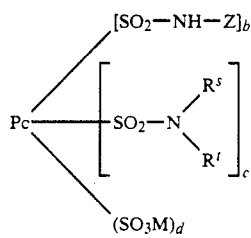

(5)

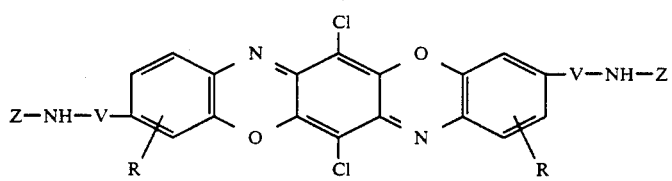

(6)

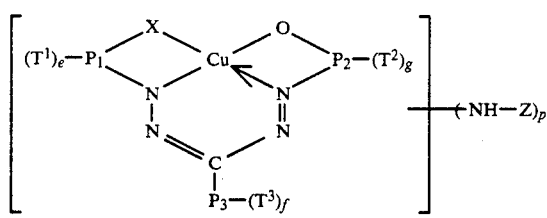

(7)

where

Z is a radical of the above-mentioned and -defined general formula (3),

M is as defined above, a is zero (in which case this group is hydrogen) or 1,

Pc is the radical of the copper or nickel phthalocyanine, which phthalocyanine radical may additionally be substituted in the 3- and/or 4-positions of the carbocyclic aromatic rings of the phthalocyanine by halogen, such as chlorine, or phenyl and in which the sulfonamido and/or sulfo groups are bonded to the 3- and/or 4-positions of the carbocyclic aromatic rings of the phthalocyanine, from 0.5 to 2.5, the sum (b+c+d) being an integer or non-integer from 3 to 4, V is a direct bond or a group conforming to the general formula —NH—E—, where E is a phenylene radical which may be substituted by 1 or 2 substituents selected from the group consisting of alkyl of 1 to 4 carbon atoms, such as ethyl or in particular methyl, alkoxy of 1 to 4 carbon atoms, such as ethoxy or in particular methoxy, halogen, such as bromine or chlorine, carboxy and sulfo, or an alkylene group of 2 to 6 carbon atoms, preferably of 2 or 3 carbon atoms, R is a hydrogen atom or an alkyl group of 1 to 4 carbon atoms, such as ethyl or in particular methyl, an alkoxy group of 1 to 4 carbon atoms, such as ethoxy or in particular methoxy, acetylamino, nitro, carboxyl, halogen, such as chlorine, or preferably sulfo, X is an oxygen atom or a sulfo group or preferably carbonyloxy —COO—, $P_1$ and $P_2$ are each independently of the other a benzene or naphthalene ring, where $P_1$ contains the nitrogen atom and the X group in ortho-position relative to each other and $P_2$ contains the oxygen atom and the nitrogen atom bonded in ortho-position relative to each other and the benzene or naphthalene rings may be further substituted by one or two substituents selected from the group consisting of halogen, such as chlorine, nitro, alkyl of 1 to 4 carbon atoms, such as methyl or ethyl, alkoxy of 1 to 4 carbon atoms, such as methoxy or ethoxy, sulfamoyl, sulfamoyl which is monosubstituted or disbustituted by alkyl of 1 to 4 carbon atoms, alkylsulfonyl of 1 to 4 carbon atoms, such as methylsulfonyl or ethylsulfonyl, and phenylsulfonyl, both $P_1$ and $P_2$ preferably each being a benzene ring, $P_3$ is a straight-chain or branched alkylene group of 2 to 6 carbon atoms, preferably 2 to 4 carbon atoms, which may be substituted by a sulfophenyl group, or is a phenylene group or a naphthylene group which may each be substituted by 1 or 2 substituents selected from the group consisting of methyl, ethyl, methoxy, ethoxy and chlorine, but preferably $P_3$ is a benzene ring, $T^1$, $T^2$ and $T^3$ are each independently of the others a sulfo or carboxy group, preferably a sulfo group, e, f and g are each independently of the others zero (in which case $T^1$ or $T^2$ or $T^3$ respectively is hydrogen), 1 or 2, the sum (e+f+g) being an integer from 1 to 4, preferably 2 or 3, in particular 2, p is 1 or 2, preferably 1, the group —NH—Z being bonded to an aromatic radical of $P_1$, $P_2$ or $P_3$, preferably to $P_2$.

Of the copper formazan dyes of the general formula (7), preference is given to those in which $P_1$ and $P_2$ are each a benzo ring and $T^1$ and $T^2$ are each a sulfo group, with e and g both being 1 if the group —NH—Z is bonded to $P_2$. If the group —NH—Z is bonded to $P_1$, then e is zero, g is 2 and $T^2$ is a sulfo group. It is also preferred for the grouping —$P^2$—$(T^3)_f$ to be a phenyl or a 2- or 4-sulfophenyl radical.

The present invention also provides processes for preparing the dyes of the general formula (1) according to the present invention. For instance, they can be prepared according to the present invention by reacting a compound of the general formula (8)

$$A—(Hal)_m \qquad (8)$$

where A is as defined above and Hal is a halogen atom, such as bromine or chlorine, which Hal may also be bonded to A via a sulfonyl group, and m is from 1 to 4, preferably 1 or 2, and if Hal is bonded to A via a sulfonyl group, m is preferably 3 or 4, with 1 to 2 times the molar amount of an amino compound of the general formula (9)

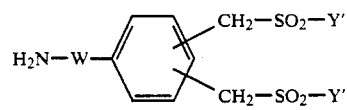

where W is as defined above and Y' has one of the meanings of Y or is the β-hydroxyl group, and, if the starting compound of the general formula (9) has Y' equal to β-hydroxyethyl, converting the resulting compound conforming to the general formula (1) in which however the two Y radicals are β-hydroxyethyl into the sulfuric half-ester compound of the general formula (1) where Y is β-sulfatoethyl in a conventional manner, for example by means of concentrated sulfuric acid at a temperature between 0° and 40° C. The sulfation can also be effected by means of chlorosulfuric acid in a polar solvent, e.g. N-methylpyrrolidone, at a temperature between 10° and 80° C. By the action of sulfuric acid or oleum on compounds of the general formula (1), in particular if Y is β-hydroxyethyl, the compounds of the formula (1) having a grouping of the formula (2) in which n is 1 or 2 can be converted into corresponding compounds of the formula (1) where n is 1 or 2 by introducing a (further) or two sulfo groups; this sulfonation reaction is carried out in a conventional manner in general at a temperature of between 30° and 80° C., preferably between 40° and 60° C.

The dyes of the general formula (1) according to the present invention can also be prepared according to the present invention by starting from dye intermediates which already contain a radical of the formula —NH—Z in which Y can also be a β-hydroxyethyl group. This variant is suitable for preparing those dyes according to the present invention in which A is the radical of a dye composed of two or more than two components, for example a copper or nickel phthalocyanine, of copper formazan or of a triphendioxazine. In principle, the dyes according to the present invention can be prepared by known methods within all dye classes by starting from intermediates for these dyes as long as at least one of these intermediates contains the grouping —NH—Z in which Y may also be β-hydroxyethyl, which is subsequently converted into the final stage, for example by esterification, such as sulfation, or by an addition reaction.

However, preference is given to the synthesis of the dyes according to the present invention by reacting a compound of the general formula (8) with a compound of the general formula (9). This condensation reaction according to the present invention is carried out in a conventional manner in an aqueous or aqueous organic solution at a temperature of between 20° and 100° C., preferably between 30° and 85° C., and at a pH between 3.5 and 10, preferably between 5.5 and 7.5, in which case, if Hal is bonded to A via a sulfonyl group, some of the sulfonyl halide groups can be hydrolyzed into sulfo groups. If the dyes prepared according to the present invention additionally possess groups capable of metal complex formation, for example hydroxy, carboxy, amino or sulfo groups, they can also be subsequently converted into the corresponding metal complex derivatives.

For instance, the anthraquinone dyes of the general formula (4) according to the present invention are prepared by reacting a compound of the general formula (4A)

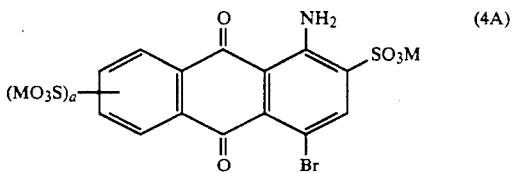

(4A)

where M and a are each as defined above, with a compound of the general formula (9), preferably in the presence of copper powder and copper(I) ions, in an aqueous medium at a temperature between 50° and 80° C. and at a pH between 7.5 and 10.5. Such procedures for reacting 1-amino-2-sulfo-4-bromoanthraquinone compounds with an amino compound are known for example from Venkataraman, The Chemistry of Synthetic Dyes, Vol. II, page 840, Academic Press, N.Y. 1952. It is preferable to start from a compound of the formula (9) in which Y' is β-hydroxyethyl and subsequently, after the condensation reaction has taken place, to convert the anthraquinone compound with the β-hydroxyethyl groups into the β-sulfatoethyl compound according to the present invention as described above.

The phthalocyanine dyes of the general formula (5) according to the present invention can be prepared for example by condensing a phthalocyaninesulfonyl chloride of the general formula (5A)

(5A)

where Pc is as defined above, h is an integer or non-integer from zero to 2, preferably zero, and j is an integer or non-integer from 2 to 4, the sum (h+j) being an integer or non-integer from 2 to 4, with an amino compound of the general formula (9) and with or without an amino compound of the general formula $H_2NR^sR^t$, where $R^s$ and $R^t$ are each as defined under the formula (5), with or without simultaneous or subsequent hydrolysis of chlorosulfonyl groups into sulfo groups. Such procedures for reacting phthalocyaninesulfonyl chloride compounds and amino compounds with or without an additional hydrolysis of chlorosulfonyl groups into sulfo groups have been repeatedly described in the literature, for example in U.S. Pat. No. 4,745,187 and the references cited therein; the preparation of the phthalocyanine dyes of the formula (5) according to the present invention can be carried out in a similar manner. For instance, the reaction is carried out with or without simultaneous hydrolysis in a preferably aqueous medium and preferably at a temperature between 20° and 45° C. and at a pH between 5.5 and 7.5

The synthesis of the triphendioxazine dyes of the general formula (6) according to the present invention is carried out for example by reacting a compound of the general formula (9), where Y' is preferably β-hydroxyethyl, with 2,3,5,6-tetrachloro-1,4-benzoquinone and then cyclizing to the triphendioxazine with optional simultaneous sulfation of the β-hydroxyethyl groups. Such procedures are described for example in British Patent No. 1,589,915 and European Patent Application Publications No. 0 141 359A, 0 141 996A and 0 168 751A. The ring closure reaction of the condensation product previously formed from the amine of the general formula (9) and the tetrachlorobenzoquinone is carried out in concentrated sulfuric acid or in particular $SO_3$-containing sulfuric acid as reaction medium at a temperature between 10° and 25° C., advantageously in the presence of an oxidizing agent, for example the abovementioned sulfur trioxide or potassium or ammonium peroxodisulfate, hydrogen peroxide or iodine.

Not only the compounds conforming to the general formula (1) but also those of the general formula (9) in which Y or Y' are each β-hydroxyethyl can be converted in a conventional manner into compounds in which Y or Y' are other than β-hydroxyethyl, for example into ester derivatives thereof, for example of polybasic inorganic acids or of aliphatic or aromatic carboxylic or sulfonic acids, for example in the compounds in which Y or Y' are each β-chloroethyl, β-sulfatoethyl, β-phosphatoethyl, β-thiosulfatoethyl, β-acetyloxyethyl or β-toluylsulfonyloxyethyl. Suitable esterifying and acylating agents for this purpose are for example the corresponding inorganic or organic acids or their anhydrides or halides or amides, for example sulfuric acid, $SO_3$-containing sulfuric acid, chlorosulfuric acid, amidosulfuric acid, phosphoric acid, polyphosphoric acid, phosphoryl chloride, mixtures of phosphoric acid and phosphorus pentoxide, acetic anhydride, toluenesulfonyl chloride or thionyl chloride.

Those compounds in which Y or Y' is vinyl can be prepared from their analogous ester derivatives by means of alkali, for example in aqueous medium at a pH of from 10 to 12 and a temperature of between 30° and 50° C. in the course of 10 to 20 minutes. The synthesis of for example β-(dialkylamino)ethylsulfonyl and β-thiosulfatoethylsulfonyl derivatives of compounds (1) and (9) is effected by reacting their vinylsulfonyl compounds with the corresponding dialkylamine or with an alkali metal salt of thiosulfuric acid, such as sodium thiosulfate. All these procedures for converting a group $-SO_2-Y'$ or $-SO_2-Y$ into another group are familiar to the person skilled in the art of fiber reactives and have been repeatedly described in the literature.

The amino compounds of the general formula (9) in which W is the direct covalent bond can be prepared by starting from a 1,2-di(halomethyl)benzene or the corresponding 1,3- or 1,4-isomers, the halogen preferably being a chlorine atom, and reacting the di(halomethyl)-benzene with mercaptoethanol in an aqueous medium at a pH of between 8 and 12, preferably between 10.5 and 11.5, and at a temperature between 30° and 130° C., preferably between 70° and 100° C., to give the corresponding dithioether compounds. Thereafter the thioether compound obtained is oxidized to the corresponding sulfonyl compound in a conventional manner. The oxidation can be carried out by various methods, for example in an aqueous, acidic medium, preferably at a pH of below 5, by means of hydrogen peroxide in the presence or absence of tungsten or vanadium compounds as catalysts, also by means of peracetic acid, potassium permanganate or chromic acid, in each case at a temperature between 50° and 120° C., preferably between 80° and 100° C., or by means of a solution of elemental chlorine in aqueous hydrochloric acid as described in German Patent No. 887,505; if chlorine/-hydrochloric acid is used, the products are the corresponding β-chloroethylsulfonyl compounds of the general formula (9).

The resulting di(β-chloroethylsulfonylmethyl)benzene or di(β-hydroxyethylsulfonylmethyl)benzene compounds are then nitrated in a conventional manner, for example in a mixture of nitric acid and concentrated sulfuric acid, at a temperature of between 30° and 100° C.

This converts the hydroxy groups into sulfuric ester groups which are then, again at elevated temperature, hydrolyzed in an aqueous mineral acid solution. The nitro compounds obtained are then reduced in a conventional manner to the aniline compounds. The reduction can be carried out by means of hydrogen over a metallic catalyst, such as a palladium, platinum or Raney nickel catalyst, under superatmospheric pressure in an autoclave, for example at a hydrogen pressure of 25 to 35 bar, and at a temperature between 40° and 80° C., or by means of a Béchamp reduction using iron filings. The β-hydroxyethylsulfonyl groups can then be converted in accordance with the above directions into fiber-reactive groups conforming to the formula —$SO_2$—Y where Y has one of the above meanings.

The starting compounds of the general formula (9) in which W is a group of the general formula (2) are preparable by reacting a compound of the general formula (9) in which Y' is β-hydroxyethyl and W is a direct covalent bond with 3- or 4-nitrobenzoyl chloride in aqueous sodium bicarbonate solution at a temperature between 20° and 70° C. and then reducing the nitro group, for example as described above.

The compounds of the general formula (1) according to the present invention—hereinafter referred to in general as compounds (1)—have fiber-reactive properties and also very useful dye properties. They can therefore be used for dyeing (including printing) hydroxy-containing and/or carboxamido-containing materials. To this end it is possible to use the solutions obtained in the synthesis of compounds (1) directly as liquid preparations with or without the addition of a buffer substance and optionally after prior concentrating.

The compounds (1) can be separated and isolated from the aqueous synthesis solutions by the commonly known methods for water-soluble compounds, for example by precipitating from the reaction medium by means of an electrolyte, for example sodium chloride or potassium chloride, or by evaporating or spray-drying the reaction solution. If the last method of isolation is chosen, it is occasionally advisable before the evaporating to dryness to remove any sulfate present in the solutions by precipitation as calcium sulfate and filtration.

The present invention therefore also relates to the use of the compounds (1) for dyeing (including printing) hydroxyl- and/or carboxamido-containing materials and processes for applying same to these substrates. Preferably, the materials find application in the form of fiber materials, in particular in the form of textile fibers, such as in the form of yarns (hanks, packages) and fabrics. The procedures employed can be similar to existing ones.

Hydroxy-containing materials are those of natural or synthetic origin, for example cellulose fiber materials or their regenerated products and polyvinyl alcohols. Cellulose fiber materials are preferably cotton or else other vegetable fibers such as linen, hemp, jute and ramie fibers; regenerated cellulose fibers are for example staple viscose and filament viscose.

Carboxamido-containing materials are for example synthetic and natural polyamides and polyurethanes, in particular in the form of fibers, for example wool and animal hairs, silk, leather, nylon-6.6, nylon-6, nylon-11 and nylon-4.

The compounds (1), if used according to the present invention, can be applied to and fixed on the substrates mentioned, in particular the fiber materials mentioned, by the application techniques known for water-soluble, fiber-reactive dyes, for example by applying or introducing said compounds (1) in dissolved form to or into the substrate and fixing them thereupon or therein with or without heating and/or with or without the action of an alkaline agent. Numerous such dyeing and fixing methods have been described in the literature.

The dyes according to the present invention are particularly suitable for the cold batch process whereby the dye is applied to the material together with the alkali using a pad mangle and then fixed by batching at room temperature over several hours. After fixation, the dyeings or prints are thoroughly rinsed with cold and hot water in the presence or absence of a dispersant which promotes the diffusion of the unfixed portions.

If dyes, for example anthraquinone dyes, according to the present invention are insufficienty soluble in the alkaline dyeing liquor, this defect can be remedied in a literature-known manner (see for example German Offenlegungsschrift No. 2,412,964) by the addition of dispersants or other uncolored compounds, for example a naphthalenesulfonic acid/formaldehyde condensate or in particular anthraquinone-2-sulfonic acid.

The dyes according to the present invention are notable for a high fiber reactivity, good fixing properties and very good buildup properties. They can therefore be applied at low dyeing temperatures by the exhaust dyeing method and require only short steaming times if applied by the pad-steam method. The degrees of fixation are high, and the unfixed portions are readily washed off, the difference between the degree of exhaustion and the degree of fixation being remarkably small, so that the hydrolysis loss is only very small. The dyes according to the present invention are also suitable in particular for printing, in particular on cotton, but also for printing nitrogen-containing fibers, for example wool or silk or blend fabrics which contain wool or silk.

The dyeings and prints on cellulose fiber materials prepared using the dyes according to the present invention exhibit a high color strength and high fiber-dye bond stability not only in the acid but also in the alkali range, and also a good light fastness and very good wet fastness properties, such as wash, water, sea water, cross-dyeing and perspiration fastness properties, and also a good pleating fastness, hot-press fastness and crock fastness.

The Examples which follow will illustrate the invention. The parts and percentages are by weight, unless otherwise stated. Parts by weight relate to parts by volume as the kilogram relates to the liter.

The compounds written in these Examples in the form of formulae are shown in the form of the free acids; in general they are prepared and isolated in the form of their alkali metal salts, such as lithium, sodium or potassium salts, and used for dyeing in the form of their salts. It is similarly possible to use in the synthesis the starting compounds and components mentioned in the form of the free acid in the Examples which follow, in particular the Table Examples, as such or in the form of their salts, preferably alkali metal salts.

The absorption maxima ($\lambda_{max}$) in the visible region reported for the compounds according to the present invention were determined in aqueous solution by means of their alkali metal salts. In the Table Examples, the $\lambda_{max}$ values have been added in brackets to the indication of hue; the wavelength is given in nm.

EXAMPLE 1

A suspension of 38.2 parts of 1-amino-2-sulfo-4-bromoanthraquinone and 46.9 parts of 2,5-di(β-hydroxyethylsulfonylmethyl)aniline in 250 parts of water is admixed with 10 parts of sodium bicarbonate and 5.3 parts of sodium carbonate. The suspension is heated to 75° C. and maintained at that temperature for three hours during which 1 part of a mixture of equal parts of copper powder and copper(I) chloride is added a little at a time. The batch is then stirred at 75° C. until the reaction has ended. The suspension is cooled down to 20° C., and the compound formed, 1-amino-2-sulfo-4-N-[2',5'-di(β-hydroxyethylsulfonylmethyl)phenyl]aminoanthraquinone, is salted out by means of 40 parts of sodium chloride, filtered off and dried. It is added to three times the weight of sulfuric acid monohydrate, and the batch is stirred until the compound is completely dissolved. The sulfuric acid solution is then poured onto ice, and the precipitated compound according to the present invention is filtered off, stirred up in ice-water and, after neutralization, isolated by spray-drying the solution.

The product obtained is an alkali metal salt of the compound of the formula

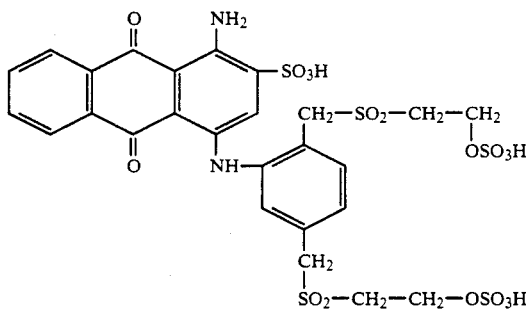

($\lambda_{max}$ = 581 nm)

which has very good fiber-reactive dye properties and, applied by the application and fixing techniques customary in the art for fiber reactive dyes, produces on the materials mentioned in the description, in particular on cellulose fibre materials, for example cotton, strong blue shades having good fastness properties.

EXAMPLE 2

A suspension of 38.2 parts of 1-amino-2-sulfo-4-bromoanthraquinone and 50 parts of 4-N-[2',5'-di(β-hydroxyethylsulfonylmethyl)phenyl]amidocarbonylaniline in 250 parts of water is admixed with 10 parts of sodium bicarbonate and 5.3 parts of sodium carbonate. The suspension is heated to 75° C. and maintained at that temperature for three hours during which 1 part of a mixture of equal parts of copper powder and copper(I) chloride is added a little at a time. The batch is then stirred at 75° C. until the reaction has ended. The suspension is cooled down to 20° C., and the compound formed, 1-amino-2-sulfo-4-N-[2',5'-di(β-hydroxyethylsulfonylmethyl)phenyl]aminoanthraquinone, is salted out by means of 40 parts of sodium chloride, filtered off and dried. It is added to four times the amount by weight of sulfuric acid monohydrate containing 10% of sulfur trioxide, and the batch is stirred until the compound has completely dissolved. The batch is then heated to 100°–110° C. and maintained within that temperature range for a further hour. The sulfuric acid solution is then poured onto ice, and the precipitated compound according to the present invention is filtered off, stirred up in ice-water and, after neutralization, isolated by spray-drying the solution.

The product obtained is an alkali metal salt of the compound of the formula

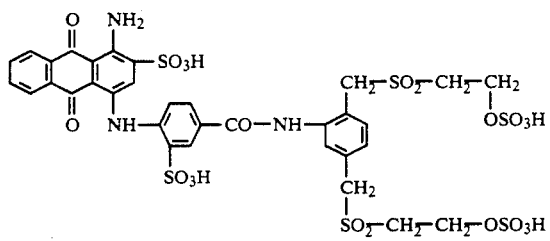

($\lambda_{max}$ = 584 nm)

which has very good fiber-reactive dye properties and, applied by the application and fixing techniques customary in the art for fiber-reactive dyes, produces on the materials mentioned in the description, in particular on cellulose fiber materials, for example cotton, strong blue shades having good fastness properties.

EXAMPLES 3 TO 12

The Table Examples which follow describe further anthraquinone dyes conforming to the general formula (A) according to the present invention:

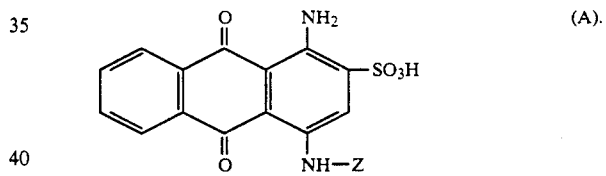

They can be prepared in a manner according to the present invention, for example similarly to the above Embodiment Examples, by reaction of 1-amino-2-sulfo-4-bromoanthraquinone and the amino compound conforming to the general formula (9) with or without simultaneous introduction of a sulfo group into the component of the formula (9). They likewise have good fiber-reactive dye properties and produce on the materials mentioned in the description, in particular on cellulose fiber materials, strong dyeings and prints having good fastness properties in the hue indicated in the particular Table Example.

| Example | Radical Z | Hue |
|---|---|---|
| 3 | 3,4-Di(β-sulfatoethylsulfonylmethyl)phenyl | blue |
| 4 | 2,4-Di(β-sulfatoethylsulfonylmethyl)phenyl | blue |
| 5 | 2-Sulfo-4-N-[2',5'-di(vinylsulfonylmethyl)phenyl]amidocarbonylphenyl | blue |
| 6 | 2-Sulfo-4-N-[3',4'-di(β-sulfatoethylsulfonylmethyl)phenyl]amidocarbonylphenyl | blue |
| 7 | 2-Sulfo-4-N-[2',4'-di(β-sulfatoethylsulfonylmethyl)phenyl]amidocarbonylphenyl | blue |
| 8 | 4-N-[2',5'-di(β-sulfatoethyl- | blue |

-continued

| Example | Radical Z | Hue |
|---|---|---|
| | sulfonylmethyl)phenyl]amidocarbonylphenyl | |
| 9 | 4-N-[3',4'-di($\beta$-sulfatoethylsulfonylmethyl)phenyl]amidocarbonylphenyl | blue |
| 10 | 3-N-[2',5'-di($\beta$-sulfatoethylsulfonylmethyl)phenyl]amidocarbonylphenyl | blue |
| 11 | 3-N-[3',4'-di($\beta$-sulfatoethylsulfonylmethyl)phenyl]amidocarbonylphenyl | blue |
| 12 | 3-N-[2',4'-di($\beta$-sulfatoethylsulfonylmethyl)phenyl]amidocarbonylphenyl | blue |

EXAMPLE 13

36 parts of copper phthalocyanine are added a little at a time to 300 parts of chlorosulfuric acid at 15° to 20° C. in the course of an hour, and the batch is gradually heated to 110° C. in the course of 2 hours and then to 135° C. in the course of an hour. It is subsequently stirred at 130° to 135° C. for a few hours, then cooled down to room temperature and poured onto a mixture of ice and water. About 40 parts of sodium chloride are added, and the precipitated copper phthalocyaninesulfonyl chloride product is filtered off and washed with NaCl-containing ice-water. 250 parts of this filter residue are suspended in 800 parts of ice-water at a pH between 2.5 and 3. A solution of 71.6 parts of 2,5-di($\beta$-sulfatoethylsulfonylmethyl)aniline in 200 parts of water is added at a pH of 2, the pH is then slowly raised to 5.0–5.5 by means of aqueous ammonia, the reaction temperature is then raised to 50° C., and the batch is subsequently stirred at that temperature for an hour while the pH is maintained at 6.5 to 7.0 by means of concentrated aqueous ammonia.

The phthalocyanine compound according to the present invention is salted out from this synthesis solution by means of sodium chloride. Said phthalocyanine compound has, written in the form of the free acid, the formula

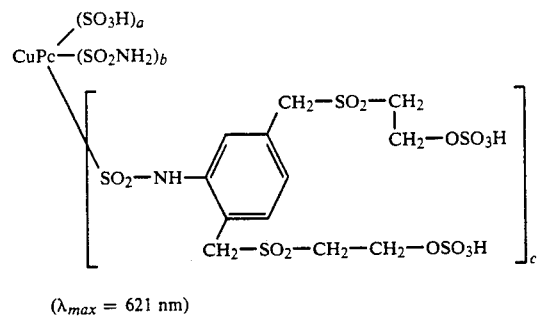

($\lambda_{max}$ = 621 nm)

in which the sum (a+b) is about 2.6 and c is about 1.4, and CuPc is the radical of copper phthalocyanine.

The copper phthalocyanine compound according to the present invention has very good fiber-reactive dye properties and applied by the usual application and fixing techniques of fiber-reactive dyes produces on the materials mentioned in the description, in particular on cellulose fiber materials, for example cotton, strong fast dyeings and prints in bright turquoise shades.

EXAMPLES 14 TO 20

The Table Examples which follow describe further copper phthalocyanine dyes according to the present invention with the aid of the general formula (B)

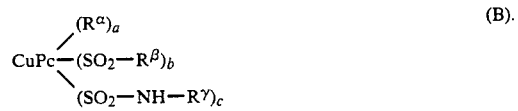

(B)

They can be prepared in a manner according to the present invention, for example as described in Example 13, by reaction of a conventional sulfo-free or sulfo-containing copper phthalocyanine sulfonyl chloride with the amino compound conforming to the general formula $H_2N-R^7$, which conforms to the amine of the general formula (9), and with or without simultaneous reaction with ammonia or another amine conforming to the general formula $H_2N-R^8$. They likewise have good fiber-reactive dye properties and applied by the usual dyeing and printing techniques for fiber-reactive dyes produce on the materials mentioned in the description, in particular on cellulose fiber materials, dyeings and prints in strong fast shades.

| Ex. | $R^\alpha$ | $R^\beta$ | a | b | $R^\gamma$ | c | Hue |
|---|---|---|---|---|---|---|---|
| 14 | Sulfo | Amino | (a + b) = | 2.6 | 3,4-Di($\beta$-sulfatoethylsulfonylmethyl)phenyl | 1.4 | turquoise |
| 15 | Sulfo | Amino | (a + b) = | 2.6 | 4-N-[2',5'-di($\beta$-sulfatoethylsulfonylmethyl)phenyl]amidocarbonylphenyl | 1.4 | turquoise |
| 16 | Sulfo | Amino | (a + b) = | 2.6 | 3-N-[2',5'-di($\beta$-sulfatoethylsulfonylmethyl)phenyl]amidocarbonylphenyl | 1.4 | turquoise |
| 17 | Sulfo | — | 2 | 0 | 2,5-Di($\beta$-sulfatoethylsulfonylmethyl)phenyl | 2 | turquoise |
| 18 | Sulfo | N-Morpholino | 1.6 | 1 | 4-N-[2',5'-Di($\beta$-sulfatoethylsulfonylmethyl)phenyl]amidocarbonylphenyl | 1.4 | turquoise |
| 19 | Sulfo | N,N-Bis($\beta$-sulfatoethyl)amino | 2 | 2 | 4-N-[2',5'-Di($\beta$-sulfatoethylsulfonylmethyl)phenyl]amidocarbonylphenyl | 1 | turquoise |
| 20 | Sulfo | N-morpholino | 2 | 1 | 3,4-Di($\beta$-sulfatoethylsulfonylmethyl)phenyl | 1 | turquoise |

EXAMPLE 21

To an aqueous solution of 50.9 parts of 4-amino-2-sulfo-2',5'-di(β-hydroxyethylsulfonylmethyl)diphenylamine are added at 50° C. 11.1 parts of 2,3,5,6-tetrachloro-1,4-benzoquinone in the course of 30 minutes during which a pH of 6 is maintained by means of about 5.5 parts of sodium carbonate. The batch is subsequently stirred for 2 hours at a pH of 6 and a temperature of 50° C., then cooled down to 20° C. and brought to a pH of 3.7 to 4.0 by means of aqueous hydrochloric acid. The precipitated product is filtered off with suction, dried and added at 20° C. to a mixture of 125 parts by volume of 20% strength oleum and 130 parts by volume of sulfuric acid monohydrate in the course of 30 minutes. The batch is subsequently stirred for about 2.5 hours to dissolve the product, 22.8 parts of ammonium peroxodisulfate are then added at 22° to 24° C. in the course of 30 minutes, and the batch is stirred at 20° C. for 90 minutes and poured onto 900 parts of ice. Calcium carbonate is added for neutralization, calcium sulfate is filtered off with suction, and the filtrate is spray-dried to isolate the novel triphendioxazine dyes of the formula (written in the form of the free acid)

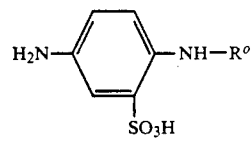
(D)

where R° has the specific meaning assigned in the particular Table Example. They likewise have very good fiber-reactive dye properties and produce fast dyeings on for example cotton in the hue indicated in the particular Table Example.

| Ex. | Radical R° | Hue |
|---|---|---|
| 22 | 3,4-Di(β-sulfatoethylsulfonylmethyl)-phenyl | reddish blue |
| 23 | 2,4-Di(β-sulfatoethylsulfonylmethyl)-phenyl | reddish blue |
| 24 | 2,4-Di(vinylsulfonylmethyl)phenyl | reddish blue |
| 25 | 2,5-Di(β-thiosulfatoethylsulfonylmethyl)phenyl | reddish blue |

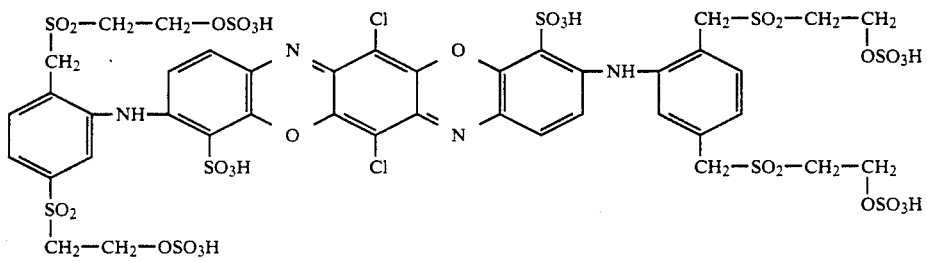

($\lambda_{max}$ = 618 nm)

It has very good fiber-reactive properties and on applied by the application techniques customary in the art for fiber-reactive dyes produces on the materials mentioned in the description, in particular on cellulose fiber materials, such as cotton, strong reddish blue dyeings having good fastness properties.

EXAMPLES 22 TO 25

The Table Examples which follow describe further triphendioxazine compounds conforming to the general formula (C) according to the present invention

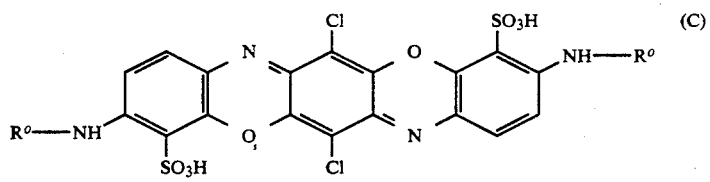
(C)

by assigning specific meanings to R°. They can be prepared in a manner according to the present invention, for example as described in Example 21, similarly to known procedures for synthesizing fiber-reactive triphendioxazine dyes, by starting from 2,3,5,6-tetrachloro-1,4-benzoquinone and the amino compound conforming to the general formula (D)

EXAMPLE A

Synthesis of 2,5-di(β-sulfatoethylsulfonylmethyl)aniline:

a) 93.8 parts of mercaptoethanol are dissolved in a mixture of 200 parts of water and 75 parts by volume of 33% strength aqueous sodium hydroxide solution; the solution has a pH between 10 and 11. To this alkaline solution are added 87.5 parts of 1,4-bis(chloromethyl)benzene and 60.6 parts of a 33% strength aqueous sodium hydroxide solution; the batch is slowly heated to 80° C., the exothermic reaction is held at about 100° C., and the batch is then stirred at 95° C. for a further 30 minutes, diluted with 200 parts of water and then brought to pH 7 with hydrochloric acid. After cooling down to 10° C., the precipitated product is filtered off with suction, washed with cold water and dried at 50° C. It has a melting point of 89°-91° C.

b) 116.2 parts of the compound obtained under a), 2,5-bis(β-hydroxyethylthiomethyl)benzene, are added together with 1.8 parts of sodium tungstenate dihydrate to 200 parts by volume of glacial acetic acid. The batch is heated to 90°-95° C., 194.3 parts of a 35% strength aqueous hydrogen peroxide solution are slowly added over several hours, the batch is subsequently stirred at 100° C. for a further hour and then stirred into a mixture of 500 parts of ice and 100 parts of potassium chloride, and the precipitated product is filtered off with suction, washed with water and dried. Colorless crystals are obtained of the compound 2,5-bis($\beta$-hydroxyethylsulfonyl)benzene having a melting point of 209°-212° C.

c) 162 parts of the compound obtained under b) are added to a mixture of 180 parts by volume of sulfuric acid monohydrate and 18 parts by volume of 65% strength oleum at a temperature of not more than 40° C. 90.8 parts of a nitrating acid comprising 30% nitric acid and 70% sulfuric acid are then slowly added at 30° to 38° C., and the batch is subsequently stirred at 70° C. for a further 4 to 5 hours and then stirred into 2000 parts of ice-water. To hydrolyzed the sulfuric ester group, the acidic solution is refluxed for about 3 hours. The batch is then cooled down and the precipitated compound, 2,5-di($\beta$-hydroxyethylsulfonylmethyl)nitrobenzene, is filtered off with suction and dried. It has a melting point of 125°-126.5° C.

d) 128.6 parts of the nitro compound obtained under c) are dissolved in 500 parts of water at 60° C. and a pH of 6.5 and hydrogenated in an autoclave at 80° C. under a hydrogen pressure of 50 bar in the presence of 50 parts of Raney nickel. The batch is then diluted with 1500 parts of hot water and filtered at 95° C. to remove the catalyst. After cooling to below 10° C., the 2,5-di($\beta$-sulfatoethylsulfonylmethyl)anilineprecipitates. It has a melting point of 201° C.

e) 84.3 parts of the aniline compound obtained under d) are added at a temperature of not more than 20° C. to a mixture of 200 parts of sulfuric acid monohydrate and 125 parts of 20% strength oleum in the course of 30 minutes. The batch is subsequently stirred for about 4 hours and then stirred into 1000 parts of ice. Excess sulfuric acid is neutralized with carbonate of lime. The precipitated calcium sulfate is filtered off with suction and washed with water, and the combined filtrates are evaporated to dryness at 50° C. The product obtained is 2,5-di($\beta$-sulfatoethylsulfonylmethyl)aniline having a melting point of above 360° C.

f) The $\beta$-sulfatoethylsulfonyl compound obtained under e) can be converted into its vinylsulfonyl derivative, which can also be used for better characterization of the structure of the sulfato derivative.

To convert the $\beta$-sulfatoethylsulfonyl compound into the vinylsulfonyl compound, 30 parts of the salt-containing product obtained under e) are added to 250 parts of water, a pH between 10 and 11 is set by means of aqueous sodium hydroxide solution, and the batch is maintained at 40° to 45° C. for one hour. The resulting 2,5-(vinylsulfonylmethyl)aniline precipitates and is filtered off with suction, washed until salt-free and dried.

The vinylsulfonyl compound formed has the following $^1$H-NMR data (in d$_6$-dimethyl sulfoxide; at 300 MHz): $\delta$ (in ppm): 7.02 (d,1H), 6.91 (m,2H), 6.65 (d,1,H), 6.52 (dd,1H), 6.16 (dd,2H), 6.12 (dd,2H), 5.29 (s,2H), 4.14 (s,2H), 4.32 (s,2H).

What is claimed is:

1. A dye conforming to the formula (1)

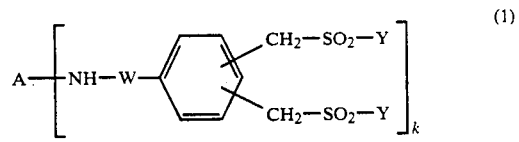

where:
A is the radical of a phthalocyanine or dioxazine dye;
W is a direct bond or a group of the formula (2)

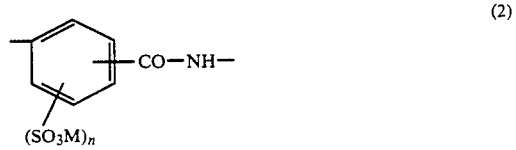

where
M is a hydrogen atom or an alkali metal and
n is zero (in which case this group is hydrogen), 1 or 2,
Y is vinyl or an ethyl group which is substituted in the $\beta$-position by a substituent which is eliminable by means of alkali to form a vinyl group, and
k is 1 or 2.

2. A triphendioxazine dye as claimed in claim 1, confirming to the formula (6),

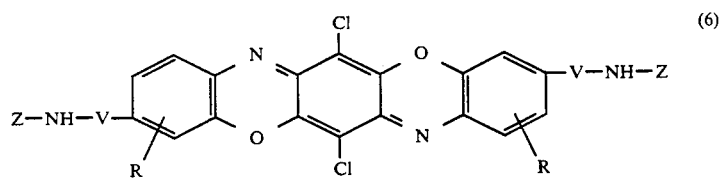

where
V is a direct bond or a group conforming to the formula -NH-E-, where E is a phenylene radical which may be substituted by 1 or 2 substituents selected from the group consisting of alkyl of 1 to 4 carbon atoms, alkoxy of 1 to 4 carbon atoms, halogen, carboxy and sulfo, or is an alkylene group of 2 to 6 carbon atoms,
R is a hydrogen atom or an alkyl group of 1 to 4 carbon atoms, an alkoxy group of 1 to 4 carbon atoms, an acetylamino, nitro or carboxy group or a halogen atom or sulfo group, and
Z is a group of the formula (3)

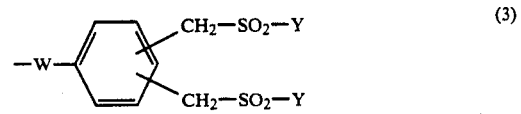

where W and Y are each as defined in claim 11.

3. A dye as claimed in claim 1, wherein W is a direct bond.

4. A phthalocyanine dye as claimed in claim 1 conforming to the formula (5)

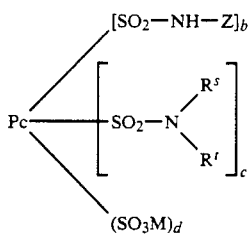

(5)

where:
M is a hydrogen atom or an alkali metal,
Pc is the radical of the copper or nickel-phthalocyanine, which phthalocyanine radical is unsubstituted or substituted in the 3-or in the 4-positions or in the 3-as well as 4-positions of the carbocyclic aromatic rings of the phthalocyanine by halogen or phenyl, and in which the sulfonamido groups and the sulfo groups or both are bonded to the 3- or 4-positions or to the 3- as well as 4-positions of the carbocyclic aromatic rings of the phthalocyanine,
$R^s$ is a hydrogen atom or an alkyl group of 1 to 4 carbon atoms, which may be substituted by sulfo, carboxy, phosphato, hydroxy, sulfato, phenyl, sulfophenyl, $\beta$-sulfatoethylsulfonyl or 3- or 4-($\beta$-sulfatoethylsulfonyl)phenyl,
$R^t$ is a hydrogen atom or alkyl group of 1 to 4 carbon atoms, which are unsubstituted or substituted by sulfo, carboxy, phosphato, hydroxy, sulfato, phenyl, sulfophenyl, $\beta$-sulfatoethylsulfonyl or 3- or 4-($\beta$-sulfatoethylsulfonyl)phenyl, or is a phenyl radical which may be substituted by 1 or 2 substituents selected from the group consisting of methyl, ethyl, methoxy, ethoxy, chlorine, sulfo, carboxy and $\beta$-sulfatoethylsulfonyl,
b is an integer or non-integer from 1 to 2,
c is an integer or non-integer from zero to 2,
d is an integer or non-integer from zero to 3, the sum (b+c+d) being an integer or non-integer from 3 to 4, and
Z is a group of the formula (3)

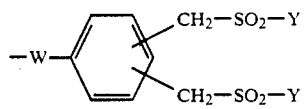

(3)

where
W is a direct bond or a group of the formula (2)

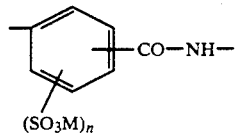

(2)

where
M is a hydrogen atom or an alkali metal and n is zero (in which case this group is hydrogen), 1 or 2,
Y is vinyl or an ethyl group which is substituted in the $\beta$-position by a substituent which is eliminable by means of alkali to form a vinyl group.

5. A compound as claimed in claim 1, wherein each Y is $\beta$-sulfatoethyl, $\beta$-chloroethyl or vinyl.

6. A compound as claimed in claim 1, wherein each Y is $\beta$-sulfatoethyl.

7. A dye as claimed in claim 1, wherein said dye is of the formula

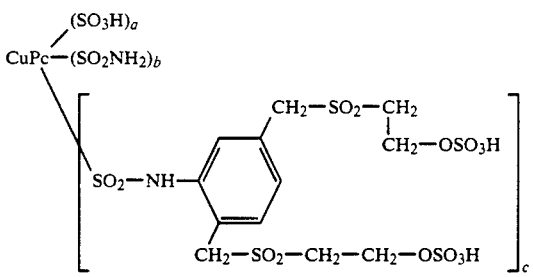

in which the sum (a+b) is about 2.6 and c is about 1.4, and CuPc is the radical of copper phthalocyanine.

* * * * *